(12) United States Patent
Gorelchenko et al.

(10) Patent No.: US 11,912,010 B2
(45) Date of Patent: Feb. 27, 2024

(54) DAMAGE RESISTANT GLASS LAMINATE AND METHODS OF MAKING THE SAME

(71) Applicant: CORNING INCORPORATED, Corning, NY (US)

(72) Inventors: Petr Gorelchenko, Corning, NY (US); Jin Su Kim, Seoul (KR); Lu Zhang, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 75 days.

(21) Appl. No.: 17/437,191

(22) PCT Filed: Feb. 25, 2020

(86) PCT No.: PCT/US2020/019642
§ 371 (c)(1),
(2) Date: Sep. 8, 2021

(87) PCT Pub. No.: WO2020/185392
PCT Pub. Date: Sep. 17, 2020

(65) Prior Publication Data
US 2022/0161518 A1    May 26, 2022

Related U.S. Application Data

(60) Provisional application No. 62/816,579, filed on Mar. 11, 2019.

(51) Int. Cl.
*B32B 7/028* (2019.01)
*B32B 17/06* (2006.01)
(Continued)

(52) U.S. Cl.
CPC .............. *B32B 7/028* (2019.01); *B32B 17/06* (2013.01); *C03C 3/091* (2013.01); *C03C 3/097* (2013.01);
(Continued)

(58) Field of Classification Search
CPC .......... B32B 17/06; C03C 3/072; C03C 3/089
See application file for complete search history.

(56) References Cited

U.S. PATENT DOCUMENTS 9,393,760 B2   7/2016  He et al.
9,581,309 B2   2/2017  Peck
(Continued)

FOREIGN PATENT DOCUMENTS

CN    103702952 A    4/2014
CN    104955641 A    9/2015
(Continued)

OTHER PUBLICATIONS

International Search Report and Written Opinion of the International Searching Authority; PCT/US2020/019642; dated Jun. 19, 2020; 12 pages; European Patent Office.
(Continued)

*Primary Examiner* — Prashant J Khatri
(74) *Attorney, Agent, or Firm* — Daniel J. Greenhalgh (57) ABSTRACT

A glass substrate comprises a glass clad layer fused to a glass core layer. The glass core layer comprises a core glass composition having an average core coefficient of thermal expansion ($CTE_{core}$) and the glass clad layer comprises a clad glass composition having an average clad coefficient of thermal expansion ($CTE_{clad}$) that is less than the $CTE_{core}$. A maximum tensile stress in the glass core layer is less than 15 MPa.

20 Claims, 5 Drawing Sheets

(51) Int. Cl.
  *C03C 3/091* (2006.01)
  *C03C 3/097* (2006.01)
  *C03C 4/18* (2006.01)
  *C03C 21/00* (2006.01)

(52) U.S. Cl.
  CPC ............ *C03C 4/18* (2013.01); *B32B 2250/03* (2013.01); *B32B 2307/308* (2013.01); *C03C 21/002* (2013.01); *C03C 2204/00* (2013.01)

(56) References Cited

U.S. PATENT DOCUMENTS

| | | | |
|---|---|---|---|
| 9,801,297 | B2 | 10/2017 | Amin et al. |
| 10,117,806 | B2 | 11/2018 | Chang et al. |
| 2007/0190338 | A1 | 8/2007 | Aitken et al. |
| 2013/0059157 | A1 | 3/2013 | Bookbinder et al. |
| 2015/0064374 | A1 | 3/2015 | Jain et al. |
| 2015/0132538 | A1 | 5/2015 | Cleary et al. |
| 2015/0291468 | A1 | 10/2015 | Boek et al. |
| 2018/0304588 | A1 | 10/2018 | Harris et al. |
| 2020/0299185 | A1 | 9/2020 | Burnett et al. |

FOREIGN PATENT DOCUMENTS

| | | | | |
|---|---|---|---|---|
| CN | 108883545 | A | 11/2018 | |
| TW | 201726392 | A | 8/2017 | |
| WO | 2013/016157 | A1 | 1/2013 | |
| WO | 2014/055840 | A2 | 4/2014 | |
| WO | 2014/160534 | A1 | 10/2014 | |
| WO | 2016/057590 | A1 | 4/2016 | |
| WO | WO-2016085778 | A1 * | 6/2016 | ............ B32B 17/04 |
| WO | 2017/066243 | A1 | 4/2017 | |
| WO | 2021/025981 | A1 | 2/2021 | |

OTHER PUBLICATIONS

Pambianchi, et al., "Corning Incorporated: Designing A New Future with Glass and Optics", In: Madsen L., Svedberg E. (eds), "Materials Research For Manufacturing: An Industrial Perspective of Turning Materials Into New Products", Springer Series Material Science, vol. 224, 2016, pp. 45.

Chinese Patent Application No. 202080020727.X, Office Action dated Oct. 19, 2022, 10 pages (English translation only), Chinese Patent Office.

* cited by examiner

DAMAGE RESISTANT GLASS LAMINATE AND METHODS OF MAKING THE SAME

CROSS-REFERENCE TO RELATED APPLICATIONS

This application claims the benefit of priority under 35 U.S.C. § 371 of International Application No. PCT/US2020/019642, filed on Feb. 25, 2020, which claims the benefit of priority under 35 U.S.C. § 119 of U.S. Provisional Application Serial No. 62/816,579 filed on Mar. 11, 2019 the content of each of which is relied upon and incorporated herein by reference in its entirety.

FIELD

The present specification generally relates to glass substrates and, more particularly, to laminated glass substrates including a plurality of glass layers and methods for forming the same.

TECHNICAL BACKGROUND

Glass in automotive exterior applications is exposed to an aggressive environment during normal driving conditions. Because mechanical impacts by various objects are unavoidable, glasses used in such applications should ensure that any damage caused by the mechanical impacts is small or even invisible, and does not degrade the retained strength of the glass substrate as a whole. Conventional glass solutions (e.g., soda lime glass substrates) still have a significant failure rate. Additionally, automotive regulations make improvement of non-composite glass improvements limited and expensive.

Accordingly, a need exists for glass substrates with improved resistance to breakage caused by deep flaws and improved mechanical reliability.

SUMMARY

According to various aspects disclosed herein, a glass substrate comprises a glass clad layer fused to a glass core layer. The glass core layer comprises a core glass composition having an average core coefficient of thermal expansion ($CTE_{core}$) and the glass clad layer comprises a clad glass composition having an average clad coefficient of thermal expansion ($CTE_{clad}$) that is less than the $CTE_{core}$. A maximum tensile stress in the glass core layer is less than 15 MPa and a compressive stress in the glass substrate extends from a surface of the glass clad layer to a depth of compression of greater than or equal to 10% of a total thickness of the glass substrate.

Another aspect includes the glass substrate of the previous aspect, wherein the clad glass composition comprises boron.

Another aspect includes the glass substrate of any of the previous aspects, wherein the clad glass composition comprises greater than or equal to 10 wt. % $B_2O_3$ and less than or equal to 50 wt. % $B_2O_3$.

Another aspect includes the glass substrate of any of the previous aspects, wherein the clad glass composition comprises greater than or equal to 10 wt. % $B_2O_3$ and less than or equal to 25 wt. % $B_2O_3$.

Another aspect includes the glass substrate of any of the previous aspects, wherein the core glass composition comprises less than or equal to 5 wt. % $B_2O_3$.

Another aspect includes the glass substrate of any of the previous aspects, wherein the maximum tensile stress in the glass core layer is less than 12 MPa.

Another aspect includes the glass substrate of any of the previous aspects, wherein the maximum tensile stress in the glass core layer is less than 10 MPa.

Another aspect includes the glass substrate of any of the previous aspects, wherein the maximum tensile stress in the glass core layer is less than 8 MPa.

Another aspect includes the glass substrate of any of the previous aspects, wherein the glass clad layer has a maximum compressive stress that is less than 180 MPa.

Another aspect includes the glass substrate of any of the previous aspects, wherein the glass clad layer has a maximum compressive stress that is less than 150 MPa.

Another aspect includes the glass substrate of any of the previous aspects, wherein the glass clad layer has a maximum compressive stress that is less than 100 MPa.

Another aspect includes the glass substrate of any of the previous aspects, wherein the compressive stress in the glass substrate extends from the surface of the glass clad layer to the depth of compression of greater than or equal to 10% of a total thickness of the glass substrate and less than or equal to 40% of the total thickness of the glass substrate.

According to aspects disclosed herein, a glass substrate comprises a glass clad layer fused to a glass core layer. The glass core layer comprises a core glass composition having an average core coefficient of thermal expansion ($CTE_{core}$) and the glass clad layer comprises a clad glass composition having an average clad coefficient of thermal expansion ($CTE_{clad}$) that is less than the $CTE_{core}$. A maximum tensile stress in the glass core layer is less than 12 MPa and the clad glass composition comprises greater than or equal to 10 wt. % $B_2O_3$ and less than or equal to 50 wt. % $B_2O_3$.

Another aspect includes the glass substrate of the previous aspect, wherein a compressive stress in the glass substrate extends from a surface of the glass clad layer to a depth of compression of greater than or equal to 10% of a total thickness of the glass substrate.

Another aspect includes the glass substrate of any of the previous two aspects, wherein the glass clad layer has a maximum compressive stress that is less than 150 MPa.

Another aspect includes the glass substrate of any of the previous three aspects, wherein the glass clad layer has a maximum compressive stress that is less than 100 MPa.

Another aspect includes the glass substrate of any of the previous four aspects, wherein the clad glass composition comprises greater than or equal to 10 wt. % $B_2O_3$ and less than or equal to 25 wt. % $B_2O_3$.

Another aspect includes the glass substrate of any of the previous five aspects, wherein the core glass composition comprises less than or equal to 5 wt. % $B_2O_3$.

Another aspect includes the glass substrate of any of the previous six aspects, wherein the maximum tensile stress in the glass core layer is less than 10 MPa.

Another aspect includes the glass substrate of any of the previous seven aspects, wherein the maximum tensile stress in the glass core layer is less than 8 MPa.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an over-view or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to various embodiments, examples of which are illustrated in the accompanying drawings. Whenever possible, the same reference numerals will be used throughout the drawings to refer to the same or like parts.

In various embodiments, a glass substrate comprises a glass clad layer fused to a glass core layer. The glass core layer comprises a core glass composition having an average core coefficient of thermal expansion ($CTE_{core}$) and the glass clad layer comprises a clad glass composition having an average clad coefficient of thermal expansion ($CTE_{clad}$) that is less than the $CTE_{core}$. A maximum tensile stress in the glass core layer is less than 15 MPa and a compressive stress in the glass substrate extends from a surface of the glass clad layer to a depth of compression of greater than or equal to 10% of a total thickness of the glass substrate.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range (e.g., 15.2).

The drawings shall be interpreted as illustrating one or more embodiments that are drawn to scale and/or one or more embodiments that are not drawn to scale. This means the drawings can be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any and all ranges or subranges that can be formed by such values.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

As used herein, the term "average coefficient of thermal expansion," or "average CTE," refers to the average coefficient of linear thermal expansion of a given material or layer between 0° C. and 300° C. As used herein, the term "coefficient of thermal expansion," or "CTE," refers to the average coefficient of thermal expansion unless otherwise indicated.

Compressive stress (including surface compressive stress) is measured a refracted near-field (RNF) technique. Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. Depth of compression (DOC) may be measured with the RNF technique or a scattered light polariscope (SCALP) technique known in the art. The maximum central tension (CT) values are measured using a scattered light polariscope (SCALP) technique known in the art.

Concentration profiles of various constituent components in the glass, such as alkali constituent components, were measured by electron probe microanalysis (EPMA). EPMA may be utilized, for example, to discern compressive stress in the glass due to the ion exchange of alkali ions into the glass from compressive stress due to lamination.

The elastic modulus (also referred to as Young's modulus) of the substrate is provided in units of gigapascals (GPa). The elastic modulus of the substrate is determined by resonant ultrasound spectroscopy on bulk samples of the substrate.

The terms "glass" and "glass composition" encompass both glass materials and glass-ceramic materials, as both classes of materials are commonly understood. Likewise, the term "glass structure" encompasses structures comprising glass. The term "reconstituted wafer- and/or panel-level package" encompasses any size of reconstituted substrate package including wafer level packages and panel level packages.

The phrase "depth of compression" and "DOC" refer to the position in the glass where compressive stress transitions to tensile stress.

The term "formed from" can mean one or more of comprises, consists essentially of, or consists of. For example, a component that is formed from a particular material can comprise the particular material, consist essentially of the particular material, or consist of the particular material.

As discussed previously, glass in automotive exterior applications is exposed to an aggressive environment during normal driving conditions. Because mechanical impacts by various objects are unavoidable, glasses used in such applications should ensure that any damage caused by the mechanical impacts is small or even invisible, and does not degrade the retained strength of the glass substrate as a whole. Accordingly, a need exists for glass substrates with improved resistance to breakage caused by deep flaws and improved mechanical reliability. Glass substrates as described herein address this need by including a maximum tensile stress in the glass core layer less than 15 MPa, to reduce crack propagation within the glass core layer. Additionally, glass substrates as described herein include a compressive stress in the glass substrate that extends from a surface of the glass clad layer to a depth of compression of greater than or equal to 10% of a total thickness of the glass substrate, imparting improved mechanical reliability such that the glass substrate may withstand deeper impacts without shattering.

Glass Laminates

In various embodiments, a glass substrate comprises at least a first layer and a second layer. For example, the first layer comprises a glass core layer, and the second layer comprises one or more glass clad layers adjacent to the glass core layer. The first layer and/or the second layer are glass layers comprising a glass material, a ceramic material, a glass-ceramic material, or a combination thereof. In some embodiments, the first layer and/or the second layer are transparent glass layers.

The glass core layer has an average core CTE (core CTE or $CTE_{core}$), and the glass clad layer has an average clad CTE (clad CTE or $CTE_{clad}$). For example, the glass core layer is formed from a core glass composition with the $CTE_{core}$ and the glass clad layer is formed from a clad glass composition with the $CTE_{clad}$. In various embodiments described herein, the $CTE_{core}$ is greater than the $CTE_{clad}$ such that the glass core layer is in tension and the glass clad layer is in compression, prior to any heat treatment or ion exchange.

Figure 1:
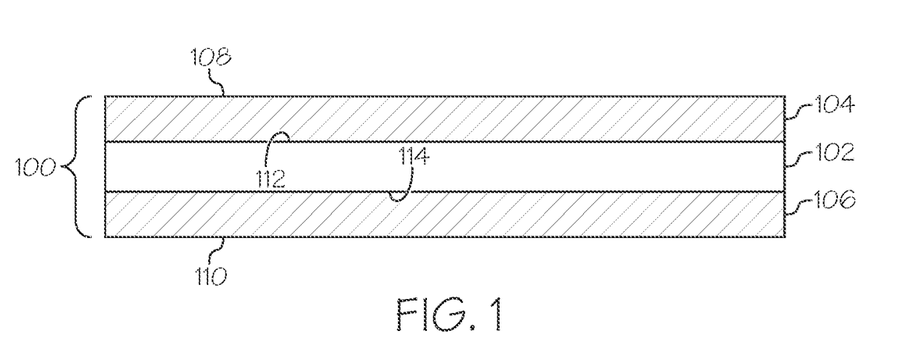
FIG. 1 is a cross-sectional view of a glass substrate in accordance with one or more embodiments shown and described herein.

FIG. 1 is a cross-sectional view of one embodiment of a glass substrate 100. The glass substrate 100 is a laminated sheet including a plurality of glass layers. In embodiments, the laminated sheet may be substantially planar, as shown in FIG. 1, or the laminated sheet may be non-planar. The glass substrate 100 comprises a glass core layer 102 disposed between a first glass clad layer 104 and a second glass clad layer 106. In some embodiments, the first glass clad layer 104 and the second glass clad layer 106 are exterior layers relative to the glass core layer 102, as shown in FIG. 1. For example, an outer surface 108 of the first glass clad layer 104 is an outer surface of the glass substrate 100 and/or an outer surface 110 of the second glass clad layer 106 is an outer surface of the glass substrate 100. In other embodiments, the first glass clad layer 104 and/or the second glass clad layer 106 are intermediate layers disposed between the glass core layer 102 and an exterior layer (not shown).

The glass core layer 102 comprises a first major surface and a second major surface opposite the first major surface. In some embodiments, the first glass clad layer 104 is fused to the first major surface of the glass core layer 102. Additionally or alternatively, the second glass clad layer 106 is fused to the second major surface of the glass core layer 102. In such embodiments, an interface 112 between the first glass clad layer 104 and the glass core layer 102 and/or an interface 114 between the second glass clad layer 106 and the glass core layer 102 are free of any bonding material such as, for example, an adhesive, a coating layer, or any non-glass material added or configured to adhere the respective glass clad layers to the glass core layer. Thus, the first glass clad layer 104 and/or the second glass clad layer 106 are fused directly to the glass core layer 102 and/or are directly adjacent to the glass core layer 102. In some embodiments, the glass substrate 100 includes one or more intermediate layers disposed between the glass core layer and the first glass clad layer and/or between the glass core layer and the glass second clad layer. For example, the intermediate layers may comprise intermediate glass layers and/or diffusion layers formed at the interface of the glass core layer and the glass clad layer. The diffusion layer can comprise a blended region comprising components of each layer adjacent to the diffusion layer (e.g., a blended region between two directly adjacent glass layers). In some embodiments, the glass substrate 100 comprises a glass-glass laminate in which the interfaces between directly adjacent glass layers are glass-glass interfaces.

In some embodiments, the glass core layer 102 comprises a core glass composition and first and/or second glass clad layers 104, 106 comprise a clad glass composition that is different than the core glass composition. The core glass composition and the clad glass composition are different from each other. For example, in the embodiment shown in FIG. 1, the glass core layer 102 comprises the core glass composition and each of the first glass clad layer 104 and the second glass clad layer 106 comprises the clad glass composition. In other embodiments, the first glass clad layer comprises the clad glass composition and the second glass clad layer comprises a third glass composition that is different than the core glass composition and/or the clad glass composition. In some embodiments described herein, the core glass composition may be a "soft" glass in comparison to the clad glass composition, and the clad glass composition may be particular selected for its damage resistance.

The glass compositions used to form the glass core layer and the glass clad layers may any one of a number of suitable glass compositions. For example, the glass compositions may generally include a combination of $SiO_2$, $Al_2O_3$, at least one alkaline earth oxides such as BeO, MgO, CaO, SrO and BaO, and/or alkali oxides, such as $Li_2O$, $Na_2O$, $K_2O$, $Rb_2O$ and $Cs_2O$. In some embodiments, the glass compositions are alkali-free, while in other embodiments, the glass compositions include one or more alkali oxides. In some embodiments, the glass compositions may further include minor amounts of one or more additional oxides, such as, by way of example and not limitation, $Sn_2O$, $Sb_2O_3$, $Zr_2O$, ZnO, or the like. These components may be added as fining agents and/or to further modify the CTE of the glass composition.

In embodiments, the glass composition generally includes $SiO_2$ in an amount greater than or equal to 35 wt. % and less than or equal to 80 wt. %. When the content of $SiO_2$ is too small, the glass may have poor chemical and mechanical durability. On the other hand, when the content of $SiO_2$ is too large, melting ability of the glass decreases and the viscosity increases, so forming of the glass becomes difficult. In some embodiments, $SiO_2$ is present in the glass composition in an amount greater than or equal to 55 wt. % and less than or equal to 80 wt. %, greater than or equal to 60 wt. % and less than or equal to 75 wt. %, or greater than or equal to 35 wt. % and less than or equal to 70 wt. %.

The glass compositions may also include $Al_2O_3$. $Al_2O_3$, in conjunction with alkali oxides present in the glass composition, such as $Na_2O$ or the like, improves the susceptibility of the glass to ion exchange strengthening. Moreover, increased amounts of $Al_2O_3$ may also increase the softening point of the glass, thereby reducing the formability of the glass. The glass compositions described herein may include $Al_2O_3$ in an amount greater than or equal to 1.5 wt. % and less than or equal to 25 wt. %, greater than or equal to 3 wt. % and less than or equal to 20 wt. %, greater than or equal to 3 wt. % and less than or equal to 17 wt. %, greater than or equal to 8 wt. % and less than or equal to 17 wt. %, greater than or equal to 10 wt. % and less than or equal to 15 wt. %, or greater than or equal to 9.5 wt. % and less than or equal to 12 wt. %.

In some embodiments described herein, the boron concentration in the glass compositions from which the glass articles are formed is a flux which may be added to glass compositions to make the viscosity-temperature curve less steep as well as lowering the entire curve, thereby improving the formability of the glass and softening the glass. In embodiments, the clad glass composition includes boron. The presence of boron in a glass composition increases the density of the glass composition, thereby reducing crack propagation. In embodiments, the clad glass composition may include $B_2O_3$. In embodiments, the clad glass composition may include greater than or equal to 10 wt. % $B_2O_3$ and less than or equal to 50 wt. % $B_2O_3$. In embodiments, the clad glass composition may include greater than or equal to 10 wt. % $B_2O_3$ and less than or equal to 25 wt. % $B_2O_3$. In embodiments, the clad glass composition may include greater than or equal to 10 wt. % $B_2O_3$, greater than or equal to 15 wt. % $B_2O_3$, greater than or equal to 20 wt. % $B_2O_3$, greater than or equal to 25 wt. % $B_2O_3$, greater than or equal to 30 wt. % $B_2O_3$, greater than or equal to 40 wt. % $B_2O_3$, or greater than or equal to 45 wt. % $B_2O_3$. In embodiments, the clad glass composition may include less than or equal to 15 wt. % $B_2O_3$, less than or equal to 20 wt. % $B_2O_3$, less than or equal to 25 wt. % $B_2O_3$, less than or equal to 30 wt. % $B_2O_3$, less than or equal to 40 wt. % $B_2O_3$, less than or equal to 45 wt. % $B_2O_3$, or less than or equal to 50 wt. % $B_2O_3$.

In comparison, in embodiments, the core glass composition may include less than or equal to 20 wt. % $B_2O_3$, less than or equal to 15 wt. % $B_2O_3$, less than or equal to 10 wt. % $B_2O_3$, less than or equal to 8 wt. % $B_2O_3$, less than or equal to 5 wt. % $B_2O_3$, less than or equal to 2 wt. % $B_2O_3$, less than or equal to 1.5 wt. % $B_2O_3$, less than or equal to 1 wt. % $B_2O_3$, or less than or equal to 0.5 wt. % $B_2O_3$. In embodiments, the core glass composition may be substantially free of $B_2O_3$.

The glass compositions may also include $P_2O_5$. The glass compositions described herein may include $P_2O_5$ in an amount greater than or equal to 1.5 wt. % and less than or equal to 25 wt. %, greater than or equal to 1.5 wt. % and less than or equal to 20 wt. %, greater than or equal to 3 wt. % and less than or equal to 15 wt. %, greater than or equal to 8 wt. % and less than or equal to 15 wt. %, greater than or equal to 10 wt. % and less than or equal to 15 wt. %, or greater than or equal to 12 wt. % and less than or equal to 14 wt. %. In embodiments, the glass compositions may be substantially free of $P_2O_5$.

Embodiments of the glass compositions may further include one or more alkali oxides (e.g., $Na_2O$, $K_2O$, $Li_2O$, or the like). The alkali oxides facilitate the melting of the glass composition, lower the 200 Poise temperature, and lower the softening point of the glass, thereby offsetting the increase in the softening point due to higher concentrations of $SiO_2$ and/or $Al_2O_3$ in the glass composition. The alkali oxides also assist in improving the chemical durability of the glass composition and tuning the CTE to a desired value. The alkali oxides are generally present in the glass composition in an amount greater than or equal to 6 wt. % and less than or equal to 40 wt. %. In some embodiments, the amount of alkali oxides may be greater than or equal to 6 wt. % and less than or equal to 28 wt. %, greater than or equal to 8 wt. % and less than or equal to 23 wt. %, greater than or equal to 9 wt. % and less than or equal to 17 wt. %, or greater than or equal to 1 wt. % and less than or equal to 8 wt. %. In all of the glass compositions described herein, the alkali oxides include at least $Na_2O$ and $K_2O$. Some embodiments the alkali oxides further include $Li_2O$.

In various embodiments, the inclusion of one or more alkali oxides in the glass compositions can enable the glass compositions to be ion exchanged according to methods known and used in the art. Ion exchanging the glass substrate may further strengthen the glass substrate and alter the stresses in the glass cladding layers and the glass core layer. However, in some embodiments, the glass substrate 100 is not ion exchanged, since ion exchange may result in dimensional changes or warpage of the glass substrate.

In order to achieve the desired CTE, include CaO may be present in the glass compositions in an amount from greater than or equal to 0 wt. % to less than or equal to 12 wt. %. In embodiments, CaO may be present in an amount of from greater than 0 wt. % to less than or equal to 8 wt. %, greater than 0 wt. % to less than or equal to 7.5 wt. %, greater than 0 wt. % to less than or equal to 5 wt. %, greater than 0 wt. % to less than or equal to 4 wt. %, greater than 0 wt. % to less than or equal to 1 wt. %, greater than or equal to 3 wt. % to less than or equal to 5 wt. %, greater than or equal to 4 wt. % to less than or equal to 8 wt. %, or greater than or equal to 5 wt. % to less than or equal to 7.5 wt. %. In some embodiments, CaO may be not be present in the glass compositions.

In embodiments of the glass compositions that include $Li_2O$, the $Li_2O$ may be present in an amount greater than or equal to 0 wt. % and less than or equal to 4 wt. %, greater than or equal to 0.5 wt. % and less than or equal to 3 wt. %, or greater than or equal to 1 wt. % and less than or equal to 2 wt. %. However, in some embodiments, the glass compositions may be substantially free of lithium and compounds containing lithium.

As another example, embodiments of the glass compositions may include $Na_2O$ in an amount greater than or equal to 0 wt. % and less than or equal to 15 wt. %, greater than 0 wt. % and less than or equal to 13 wt. %, greater than or equal to 1 wt. % and less than or equal to 12 wt. %, greater than or equal to 6 wt. % and less than or equal to 15 wt. %, greater than or equal to 10 wt. % and less than or equal to 12 wt. %, greater than or equal to 0 wt. % and less than or equal to 5 wt. %, or greater than or equal to 1 wt. % and less than or equal to 15 wt. %.

The concentration of $K_2O$ in the glass also influences the CTE of the glass composition. Accordingly, in some embodiments, the amount of $K_2O$ is greater than or equal to 0 wt. % and less than or equal to 15 wt. %, greater than or equal to 0 wt. % and less than or equal to 10 wt. %, or greater than or equal to 0 wt. % and less than or equal to 7 wt. %, greater than 0 wt. % and less than or equal to 5 wt. %, greater than 1 wt. % and less than or equal to 4.5 wt. %, or greater than 1 wt. % and less than or equal to 3.5 wt. %. In some embodiments, the glass composition may be substantially free of $K_2O$.

As provided hereinabove, embodiments of the glass compositions may further include one or more alkaline earth oxides. The alkaline earth oxide may include, for example, MgO, CaO, SrO, BaO, or combinations thereof. Alkaline earth oxides improve the meltability of the glass batch oxides and increase the chemical durability of the glass composition, in addition to influencing the CTE. In the glass compositions described herein, the glass compositions generally include at least one alkaline earth oxide in an amount greater than or equal to 1 wt. % and less than or equal to 22 wt. %, greater than or equal to 2 wt. % and less than or equal to 12 wt. %, greater than or equal to 1 wt. % and less than or equal to 6 wt. %, greater than or equal to 9 wt. % and less than or equal to 22 wt. %, greater than or equal to 12.5 wt. % and less than or equal to 21 wt. %, greater than or equal to 7 wt. % and less than or equal to 20 wt. %, greater than 0 wt. % and less than or equal to 12.5 wt. %, or greater than 0 wt. % and less than or equal to 10 wt. %.

MgO may be present in an amount from greater than or equal to 0 wt. % to less than or equal to 15 wt. %, greater than or equal to 1 wt. % and less than or equal to 10 wt. %, greater than or equal to 1 wt. % and less than or equal to 7 wt. %, greater than or equal to 1 wt. % and less than or equal to 5 wt. %, or even greater than 0 wt. % and less than or equal to 4 wt. %. However, it is contemplated that in some embodiments, MgO may not be included in the glass composition.

In some embodiments, SrO may be included in the glass composition in an amount greater than 0 wt. % and less than or equal to 10 wt. %, greater than or equal to 0.1 wt. % and less than or equal to 5 wt. %, or even greater than or equal to 1 wt. % and less than or equal to 5 wt. %. In some embodiments, SrO may not be present in the glass composition.

In embodiments including BaO, the BaO may be present in an amount greater than about 0 wt % and less than about 3 wt. %. In some of these embodiments, BaO may be present in the glass composition in an amount less than or equal to about 2 wt. %, less than or equal to about 1.5 wt. %, or even less than or equal to about 1 wt. %.

In addition to the $SiO_2$, $Al_2O_3$, alkali oxides and alkaline earth oxides, a first embodiment of exemplary base glass compositions may optionally include one or more fining agents, such as, by way of example and not limitation, $SnO_2$, $Sb_2O_3$, $As_2O_3$, and/or halogens such as $F^-$ and/or $Cl^-$ (from NaCl or the like). When a fining agent is present in the glass composition, the fining agent may be present in amount less than or equal to 1 wt. % or even less than or equal to 0.5 wt. %. When the content of the fining agent is too large, the fining agent may enter the glass structure and affect various glass properties. However, when the content of the fining agent is too low, the glass may be difficult to form. For example, in some embodiments, $SnO_2$ is included as a fining agent in an amount greater than or equal to 0.25 wt. % to less than or equal to 0.50 wt. %.

In some embodiments, the glass compositions have a liquidus viscosity suitable for forming the glass substrate 100 using a fusion draw process as described herein. For example, each of the glass compositions may have a liquidus viscosity of at least about 100 kP, at least about 200 kP, or at least about 300 kP. Additionally or alternatively, the core glass composition comprises a liquidus viscosity of less than about 3000 kP, less than about 2500 kP, less than about 1000 kP, or less than about 800 kP. The clad glass composition of the clad layers 104 and 106 may have a liquidus viscosity of at least about 50 kP, at least about 100 kP, or at least about 200 kP. Additionally or alternatively, the clad glass composition comprises a liquidus viscosity of less than about 3000 kP, less than about 2500 kP, less than about 1000 kP, or less than about 800 kP. The core glass composition can aid in carrying the clad glass composition over the overflow distributor to form the clad layer. Accordingly, the clad glass composition can have a liquidus viscosity that is lower than generally considered suitable for forming a single layer sheet using a fusion draw process.

It should be appreciated that numerous changes can be made to the embodiments of the glass substrate 100 shown in FIG. 1. For example, in some embodiments, the glass substrate 100 can include only two glass layers 102, 104. In other embodiments, the glass substrate 100 can include four or more glass layers. Numerous other variations are also contemplated.

A variety of processes may be used to produce the glass substrates 100 described herein including, without limitation, lamination slot draw processes, lamination float processes, or fusion lamination processes. Each of these lamination processes generally involves flowing a first molten glass composition, flowing a second molten glass composition, and contacting the first molten glass composition with the second molten glass composition at a temperature greater than the glass transition temperature of either glass composition to form an interface between the two compositions such that the first and second molten glass compositions fuse together at the interface as the glass cools and solidifies.

In one particular embodiment, the glass substrates 100 described herein may be formed by a fusion lamination process such as the process described in U.S. Pat. No. 4,214,886, which is incorporated herein by reference.

Figure 2:
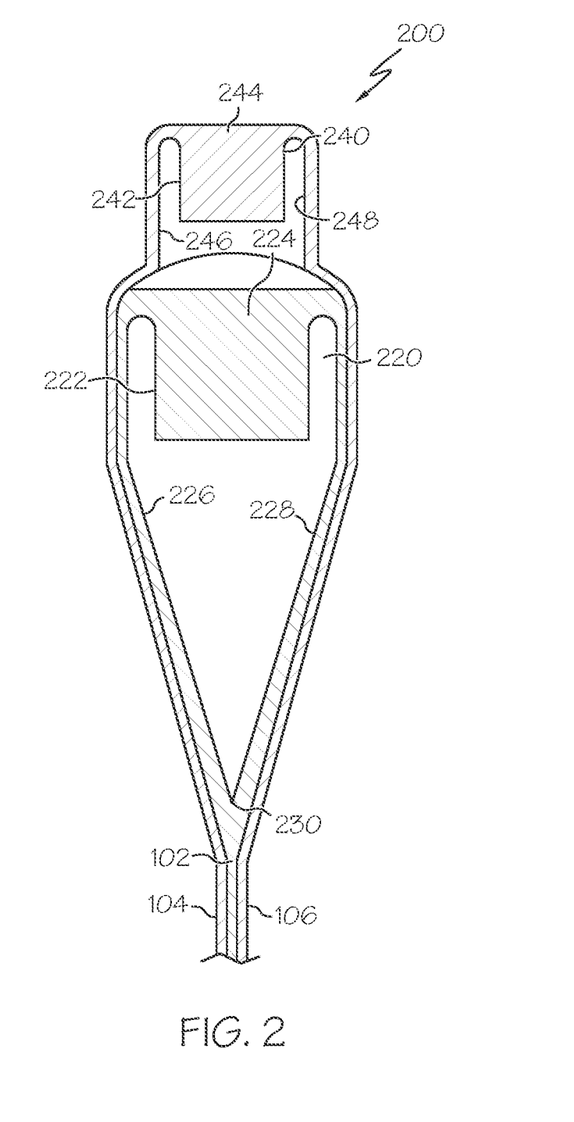
FIG. 2 schematically depicts an apparatus for forming a glass substrate in accordance with one or more embodiments shown and described herein.

Referring to FIG. 2 by way of example, a laminate fusion draw apparatus 200 for forming a laminated glass article is shown. For example, the fusion draw apparatus 200 includes a lower overflow distributor 220 and an upper overflow distributor 240 positioned above the lower overflow distributor 220. The lower overflow distributor 220 includes a trough 222. A core glass composition 224 is melted and fed into the trough 222 in a viscous state. The core glass composition 224 forms the glass core layer 102 of the glass substrate 100 as further described below. The upper overflow distributor 240 includes a trough 242. A clad glass composition 244 is melted and fed into the trough 242 in a viscous state. The clad glass composition 244 forms first and second glass clad layers 104, 106 of the glass substrate 100 as further described below.

The core glass composition 224 overflows trough 222 and flows down opposing outer forming surfaces 226 and 228 of the lower overflow distributor 220. The outer forming surfaces 226 and 228 converge at a draw line 230. The separate streams of the core glass composition 224 flowing down respective outer forming surfaces 226 and 228 of the lower overflow distributor 220 converge at the draw line 230 where they are fused together to form the core layer 102 of the glass substrate 100.

The clad glass composition 224 overflows the trough 242 and flows down opposing outer forming surfaces 246 and 248 of the upper overflow distributor 240. The clad glass composition 244 is deflected outward by the upper overflow distributor 240 such that the clad glass composition 244 flows around the lower overflow distributor 220 and contacts the core glass composition 224 flowing over the outer forming surfaces 226 and 228 of the lower overflow distributor 220. The separate streams of the clad glass composition 244 are fused to the respective separate streams of the core glass composition 224 flowing down the respective outer forming surfaces 226 and 288 of the lower overflow distributor 220. Upon convergence of the streams of the core glass composition 224 at the draw line 230, the clad glass composition 244 forms first and second glass clad layers 104, 106 of the glass substrate 100.

In some embodiments, the core glass composition 224 of the glass core layer 102 in the viscous state is contacted with the clad glass composition 244 of the first and second glass clad layers 104, 106 in the viscous state to form the laminated sheet. In some of such embodiments, the laminated sheet is part of a glass ribbon traveling away from the draw line 230 of the lower overflow distributor 220, as shown in FIG. 2. The glass ribbon can be drawn away from the lower overflow distributor 220 by a suitable means including, for example, gravity and/or pulling rollers. The glass ribbon cools as it travels away from the lower overflow distributor 220. The glass ribbon is severed to separate the laminated sheet therefrom. Thus, the laminated sheet is cut from the glass ribbon. The glass ribbon can be severed using a suitable technique such as, for example, scoring, bending, thermally shocking, and/or laser cutting. In some embodiments, the glass substrate 100 comprises the laminated sheet as shown in FIG. 1. In other embodiments, the laminated sheet can be processed further (e.g., by cutting or molding) to form the glass substrate.

Although the glass substrate 100 is shown in FIG. 1 as including three layers, other embodiments are contemplated. For example, the glass substrate may have two, four, or more layers. Glass substrates including two layers can be formed using two overflow distributors positioned such that the two layers are joined while traveling away from the respective draw lines of the overflow distributors or by using a single overflow distributor with a divided trough such that two glass compositions flow over opposing outer forming surfaces of the overflow distributor and converge at the draw line of the overflow distributor. Glass substrates including four layers can be formed using additional overflow distributors and/or using overflow distributors with divided troughs. Thus, a glass substrate having a predetermined number of layers can be formed by modifying the overflow distributor accordingly.

Although the glass substrate 100 is shown in FIG. 1 as comprising a laminated sheet, other forms are contemplated. For example, the glass substrate may be in the form of a laminated tube comprising multiple tubular layers (e.g., formed by one or more annular orifices), and a partial cross-section of the laminated tube may have a laminated structure similar to that shown in FIG. 1. In other embodiments, the glass substrate may be a shaped glass substrate, such as may be formed by shaping or molding a laminated sheet.

In some embodiments, the glass substrate 100 has a total thickness of at least about 0.1 mm, at least about 0.5 mm, at least about 0.7 mm, at least about 1 mm, at least about 1.3 mm, or at least about 1.4 mm. Additionally or alternatively, the glass substrate 100 has a total thickness of less than about 3 mm, less than about 2.5 mm, less than about 2 mm, less than about 1.7 mm, or less than about 1.6 mm. In embodiments, the glass substrate 100 has a thickness of from 1 mm to 2 mm, from 1.2 mm to 2 mm, from 1.4 mm to 2 mm, from 1.5 mm to 2 mm, from 1.6 mm to 2 mm, from 1.8 mm to 2 mm, from 1 mm to 1.8 mm, from 1.2 mm to 1.8 mm, from 1.4 mm to 1.8 mm, from 1.5 mm to 1.8 mm, from 1.6 mm to 1.8 mm, from 1 mm to 1.6 mm, from 1.2 mm to 1.6 mm, from 1.4 mm to 1.6 mm, from 1.5 mm to 1.6 mm, from 1 mm to 1.5 mm, from 1.2 mm to 1.5 mm, from 1.4 mm to 1.5 mm, from 1 mm to 1.4 mm, from 1.2 mm to 1.4 mm, from 1 mm to 1.2 mm, or of about 1.5 mm.

In some embodiments, a ratio of a thickness of the glass core layer 102 to a total thickness of the glass clad layers 104, 106 combined is at least about 1, a least about 2, at least about 3, at least about 4, at least about 5, at least about 6, at least about 7, at least about 8, or at least about 10. Additionally or alternatively, the ratio of the thickness of the glass core layer to the thickness of the glass clad layers 104, 106 combined is less than about 10, less than about 8, less than about 7, less than about 6, less than about 5, or less than about 4. In embodiments, the ratio of the thickness of the glass core layer to the thickness of the glass clad layers 104, 106 combined is from about 3 to about 7.

In embodiments, each glass clad layer 104, 106 has a thickness that is greater than or equal to 10% of the total thickness of the laminated glass substrate 100. In embodiments, the thickness of each glass clad layer 104, 106 may be greater than or equal to 12%, greater than or equal to 15%, greater than or equal to 20%, greater than or equal to 25%, greater than or equal to 30%, or greater than or equal to 35% of the total thickness of the laminated glass substrate 100. In embodiments, the thickness of each glass clad layer 104, 106 may be less than or equal to 12%, less than or equal to 15%, less than or equal to 20%, less than or equal to 25%, less than or equal to 30%, less than or equal to 35%, or less than or equal to 40% of the total thickness of the laminated glass substrate 100. Glass clad layers having a thickness of greater than or equal to 10% of the total thickness of the laminated glass substrate 100 aids in preventing catastrophic failure of the glass substrate 100 due to the introduction of deep flaws, such as scratches or the like, in the surface of the laminated glass substrate 100. In the embodiments described herein, the composition of the glass clad layers 104, 106 is different than the composition of the glass core layer 102 in order to achieve specific attributes in the final laminated glass substrate 100.

Mechanical Strengthening

In various embodiments, the glass substrate 100 is mechanically strengthened. For example, the glass core layer 102 may comprise a core glass composition having an average core coefficient of thermal expansion ($CTE_{core}$). In embodiments, the clad glass composition forming the first and/or second glass clad layers 104, 106 may have a different CTE than the core glass composition forming the glass core layer 102. In particular, in some embodiments, the first and second glass clad layers 104, 106 may comprise a clad glass composition having an average clad coefficient of thermal expansion ($CTE_{clad}$) that is less than the $CTE_{core}$. The CTE mismatch (i.e., the difference between the CTE of the first and second glass clad layers 104, 106 and the CTE of the glass core layer 102) results in the formation of compressive stress in the glass clad layers and tensile stress in the glass core layer upon cooling of the glass substrate 100. Surface compressive stresses tend to suppress existing surface flaws from developing into cracks. Higher CTE mismatch results in higher surface compression in the glass clad layer. Additionally, a thicker glass clad layer results in a deeper depth of compression (DOC). However, such higher surface compressive stress and deeper DOC also result in increasing tensile stress in the core layer. Accordingly, the various factors should be balanced with one another as described herein.

The compressive stress in the clad due to the CTE differential between the core and the clad may be approximated with the following equations:

$$\frac{\sigma_{clad}}{\sigma_{core}} = -\left(\frac{t_{core}}{2t_{clad}}\right) = -k;$$

$$\sigma_{clad} = \frac{(\alpha_{clad} - \alpha_{core})\Delta T}{\frac{1}{kE_{core}^{eff}} + \frac{1}{E_{clad}^{eff}} - \Delta T\left(\frac{\alpha_{core}}{kE_{core}^{eff}} + \frac{\alpha_{clad}}{E_{clad}^{eff}}\right)};$$

$$E_{core}^{eff} = \frac{E_{core}}{(1 + v_{core})(1 - 2v_{core})};$$

$$E_{clad}^{eff} = \frac{E_{clad}}{(1 + v_{clad})(1 - 2v_{clad})};$$

where $t_{core}$ the core thickness, $t_{clad}$ clad thickness, $\alpha_{clad}$ is the clad coefficient of thermal expansion, $\alpha_{core}$ is the core coefficient of thermal expansion, $\Delta T$ is the effective temperature difference, $E_{core}$ is the elastic modulus of the core, $E_{clad}$ is the elastic modulus of the clad, $v_{core}$ is the Poisson's ratio of the core and $v_{clad}$ is the Poisson's ratio of the clad. In general $\alpha_{clad} \ll \Delta T$ and $\alpha_{core}\Delta T \ll 1$, hence:

$$\sigma_{clad} \approx \frac{(\alpha_{clad} - \alpha_{core})\Delta T}{\frac{1}{kE_{core}^{eff}} + \frac{1}{E_{clad}^{eff}}}.$$

In the embodiments described herein, the CTE differential between the glass core layer 102 and the glass clad layers 104, 106 (i.e., $|CTE_{core} - CTE_{clad}|$) is sufficient to generate a surface compressive stress in the clad layers. In some embodiments, the CTE differential between the glass core layer 102 and the glass clad layers 104, 106 is sufficient to create a compressive stress in the glass clad layers 104, 106 of greater than or equal to 10 MPa and less than or equal to 200 MPa which extends from a surface of the glass clad layer 104, 106 and through the thickness of the glass clad layers 104, 106 to the interface between the glass clad layers 104, 106 and the glass core layer 102. That is, the compressive stress due to the CTE differential between the glass core layer 102 and the glass clad layers 104, 106 is greater than or equal to 10 MPa and less than or equal to 200 MPa. In embodiments, the glass clad layer has a maximum compressive stress that is less than 200 MPa, less than 180 MPa, less than 150 MPa, less than 100 MPa, less than 75 MPa, less than 50MPa, less than 40 MPa, less than 30 MPa, or less than 25 MPa, less than 20 MPa, or less than 15 MPa. In some particular embodiments, the compressive stress is constant from the surface of the glass clad layer to the interface between the glass clad layer and the glass core layer, although other stress profiles are contemplated.

The high surface compression can help to prevent flaws from propagating within the depth of the glass substrate. Additionally, the continued high compression level meets the flaw through a greater depth of the glass substrate described herein, helping to arrest the propagation of the flaw. Thus, the increased compression can provide improved resistance to flaw propagation compared to a glass substrate strengthened by mechanical strengthening alone.

If a flaw does propagate beyond surface, the compressive stress extending relatively deep into the glass substrate (e.g., a deep depth of compression, or DOC) can help to prevent failure of the glass substrate as a result of the flaw (e.g., by preventing the flaw from reaching the core layer that is in tension). Thus, the presence of the increased compression through a greater depth of the glass substrate (e.g., provided by mechanical strengthening) can provide improved resistance to failure compared to a glass substrate having a rapidly decreasing compressive stress deeper into the glass substrate.

In embodiments, the compressive stress due to the CTE differential between the glass core layer 102 and the glass clad layers 104, 106 extends from a surface of the glass clad layer to a DOC that is greater than or equal to 10% of the total thickness of the laminated glass substrate 100. Moreover, in various embodiments, the thickness of the clad layer may be adjusted to provide for a varying DOC as well as improved retained strength for flaws of various ranges. Accordingly, the retained strength can be adjusted by adjusting the DOC to address flaws of various sizes.

For example, in some embodiments, the depth of compression is greater than or equal to 12%, greater than or equal to 15%, greater than or equal to 20%, greater than or equal to 25%, greater than or equal to 30%, or greater than or equal to 35% of the total thickness of the laminated glass substrate 100. In some embodiments, the depth of compression is less than or equal to 40%, less than or equal to 35%, less than or equal to 30%, less than or equal to 25%, less than or equal to 20%, less than or equal to 15%, or less than or equal to 12% of the total thickness of the laminated glass substrate 100.

In the embodiments described herein, the CTE differential between the glass core layer 102 and the glass clad layers 104, 106 (i.e., $|CTE_{core}-CTE_{clad}|$) is sufficient to generate a tensile stress in the glass core layer 102, also known as a core tension or central tension. In some embodiments, the CTE differential between the glass core layer 102 and the glass clad layers 104, 106 is sufficient to create a tensile stress in the glass core layer 102 of greater than or equal to 1 MPa and less than or equal to 20 MPa which extends through the thickness of the glass core layer 102. That is, the tensile stress due to the CTE differential between the glass core layer 102 and the glass clad layers 104, 106 is greater than or equal to 1 MPa and less than or equal to 20 MPa.

In conventional laminated glasses, the glass core layer may have a maximum tensile stress of greater than 20 MPa, so as to provide a large CTE differential and achieve a high compressive stress on the clad layers 104, 106. However, a glass core layer 102 with a maximum tensile stress of less than 20 MPa, as disclosed herein, may exhibit reduced crack propagation within the core layer 102 as compared to a conventional core layer with a maximum tensile stress of greater than 20 MPa. Without being bound by theory, if the maximum tensile stress of a core layer 102 is greater than 9 MPa, a crack that occurs within the core layer 102 may propagate throughout the core layer 102, whereas a core layer 102 with a maximum tensile stress of less than 9 MPa may prevent crack propagation. In embodiments, the glass core layer has a maximum tensile stress that is less than 20 MPa, less than 15 MPa, less than 12 MPa, less than 10 MPa, less than 9 MPa, less than 8 MPa, less than 7 MPa, less than 6 MPa, or less than 5 MPa.

In addition to providing improved strength and stress profiles, in various embodiments, the glass substrates disclosed herein can provide improved resistance to sharp contact damage events, as evidenced by the Vickers crack initiation test performance. A glass substrate as described herein may have a Vickers crack initiation threshold of greater than 400 mm and less than or equal to 1000 mm, greater than 400 mm and less than or equal to 850 mm, greater than 400 mm and less than or equal to 700 mm, greater than 400 mm and less than or equal to 600 mm, greater than 400 mm and less than or equal to 550 mm, greater than 550 mm and less than or equal to 1000 mm, greater than 550 mm and less than or equal to 850 mm, greater than 550 mm and less than or equal to 700 mm, greater than 550 mm and less than or equal to 600 mm, greater than 600 mm and less than or equal to 1000 mm, greater than 600 mm and less than or equal to 850 mm, greater than 600 mm and less than or equal to 700 mm, greater than 700 mm and less than or equal to 1000 mm, greater than 700 mm and less than or equal to 850 mm, or greater than 850 mm and less than or equal to 1000 mm.

The Vickers dart drop test measurements described herein are performed by dropping an indentation load of 8.5 grams to the glass surface with an incremental drop height increase until the failure is reached. The failure is defined as when the glass surface exhibits any number of radial/median cracks emanating from the corners of the indent impression that are greater than 10 mm. All measurements are performed at room temperature.

EXAMPLES

The embodiments described herein will be further clarified by the following examples.

Example substrates A-F were prepared including glass core layers formed from one of the core glass compositions listed in Table 1 below and one or more of the clad glass compositions listed in Table 2 below.

TABLE 1

Example Glass Core Layer Compositions

| Analyzed composition in wt. % | C1 | C2 | C3 |
|---|---|---|---|
| SiO$_2$ | 56.57 | 69.86 | 72.62 |
| Al$_2$O$_3$ | 16.75 | 10.99 | 8.00 |
| B$_2$O$_3$ | 10.27 | 0.00 | 1.02 |
| P$_2$O$_5$ | 0.00 | 0.00 | 13.12 |
| CaO | 4.54 | 0.00 | 3.62 |
| Li$_2$O | 0.00 | 0.00 | 1.5 |
| Na$_2$O | 0.00 | 11.74 | 0.00 |
| K$_2$O | 3.18 | 4.07 | 0.00 |
| MgO | 3.79 | 2.87 | 0.00 |
| SrO | 4.74 | 0.00 | 0.12 |
| SnO$_2$ | 0.16 | 0.45 | 0.00 |

TABLE 2

Example Clad Glass Compositions

| Analyzed composition in wt. % | CL1 | CL2 |
|---|---|---|
| SiO$_2$ | 60.19 | 75.09 |
| Al$_2$O$_3$ | 11.66 | 3.10 |
| B$_2$O$_3$ | 17.75 | 16.00 |
| CaO | 7.07 | 0.77 |
| Na$_2$O | 0.00 | 3.40 |
| K$_2$O | 0.00 | 0.00 |
| MgO | 1.38 | 0.00 |
| SrO | 1.79 | 0.00 |
| SnO$_2$ | 0.16 | 0.25 |
| BaO | 0.00 | 1.38 |
| Fe$_2$O$_3$ | 0.00 | 0.01 |

In particular, Example A is a 0.7 mm thick laminate glass with a core composition of C1 and a clad composition of CL1 as described herein, with a ratio of 4.2. Example B is a 1.0 mm thick laminate glass with a core composition of C1 and a clad composition of CL1 as described herein, with a ratio of 4.0. Example C is a 1.3 mm thick laminate glass with a core composition of Cl and a clad composition of CL1 as described herein, with a ratio of 4.0. Example D is a 1.5 mm thick laminate glass with a core composition of C1 and a clad composition of CL1 as described herein, with a ratio of 4.0. Example E is a 1.5 mm thick laminate glass with a core composition of Cl and a clad composition of CL1 as described herein, with a ratio of 3.0. Example F is a 1.0 mm thick laminate glass with a core composition of C2 and a clad composition of CL2 as described herein, with a ratio of 7.

Comparative Examples 1-5 were also prepared. Comparative Example 1 is a 1.05 mm thick annealed soda lime glass, which typically has a composition of 73% $SiO_2$, 15% $Na_2O$, 7% CaO, 4% MgO, and 1% $Al_2O_3$. Comparative Example 2 is a 1.1 mm thick piece of Dragontrail™ glass, a high ion exchange aluminosilicate glass with a composition of 9% Al, 0.02% Fe, 0.08% Hf, 5.91% K, 8.82% Mg, 11.37% Na, 0.12% S, 61.36% Si, 0.01 Ti, and 4.81% Zr manufactured by Asahi Glass Corporation. Comparative Examples 3 and 4 are Corning® Eagle XG® (EXG) glass, alkaline earth boro-aluminosilicate glasses, which are 0.7 mm and 1.3 mm thick, respectively. Comparative Example 5 is a 1.0 mm thick piece of Code 2318 glass substrate, an ion exchanged aluminosilicate glass manufactured by Corning, Inc.

Figure 3:
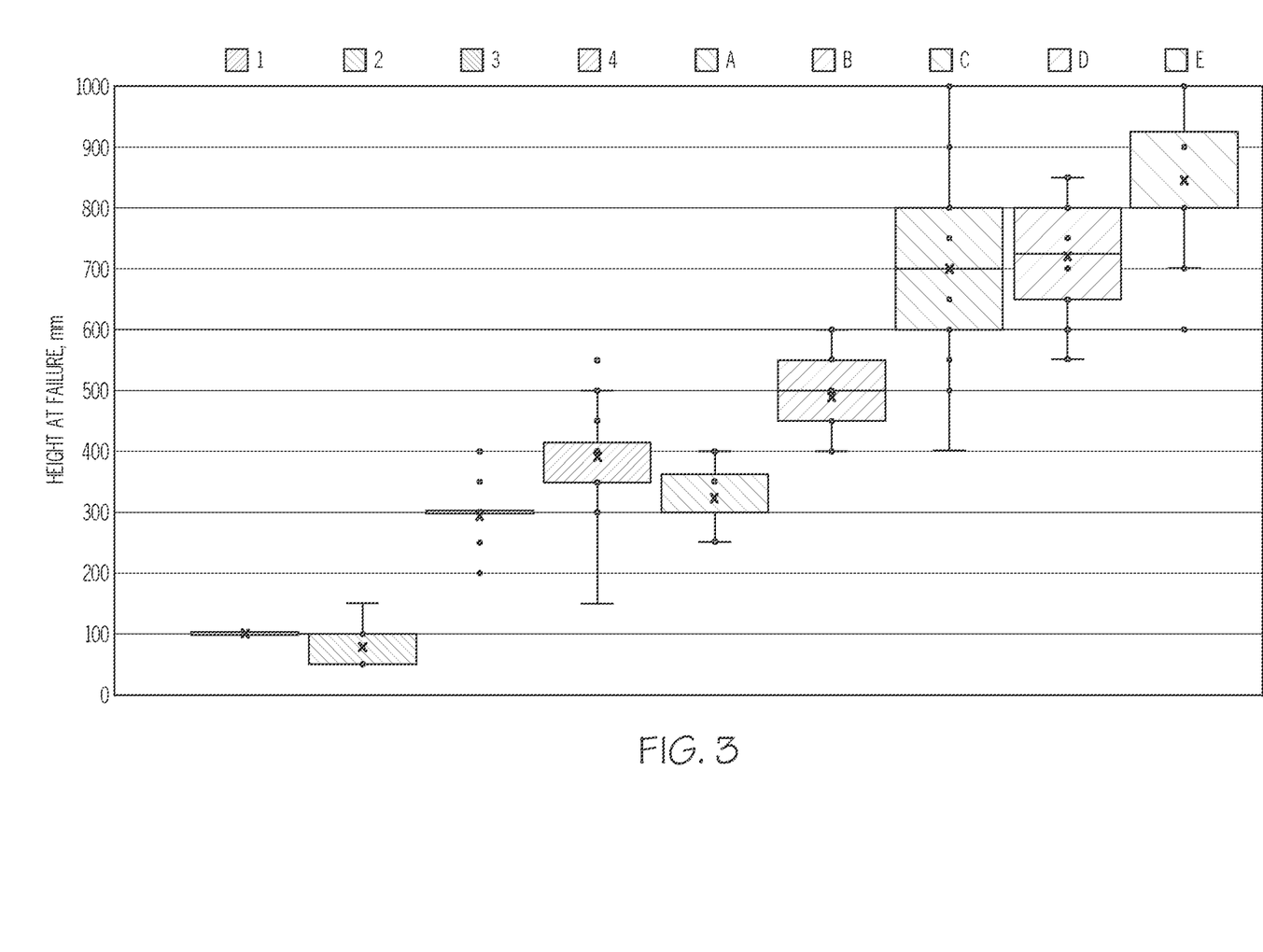
FIG. 3 is a plot of the failure heights of comparative examples and example embodiments in accordance with one or more embodiments shown and described herein.
Figure 4:
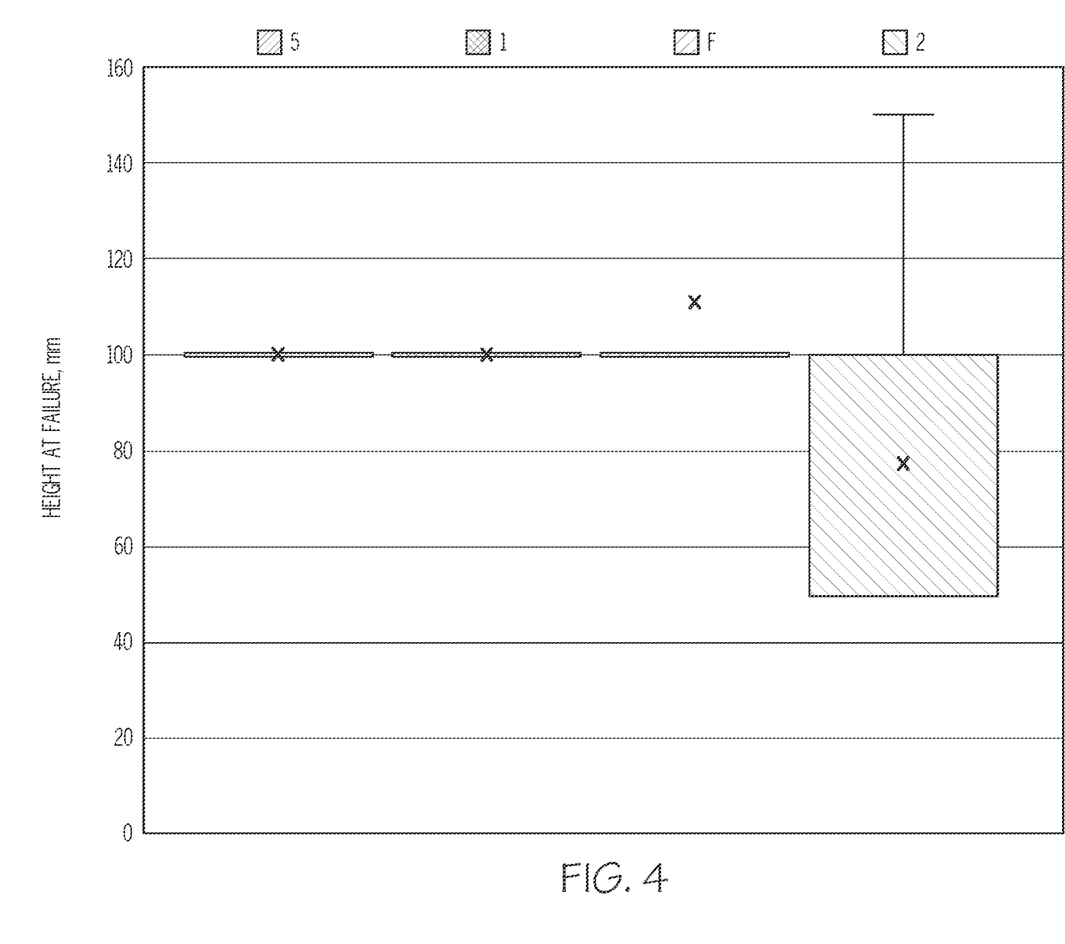
FIG. 4 is a plot of the failure heights of comparative examples and example embodiments in accordance with one or more embodiments shown and described herein.

For each of Examples A-F and Comparative Examples 1-5, Vickers dart drop tests were performed on samples approximately 10 cm×10 cm and supported on a 30.5×30.5× 2.5 cm aluminum plate. Each sample was also supported on a single sheet of 24# paper to eliminate uneven support by small particles. No backer tape was used. Height at failure was recorded. FIGS. 3 and 4 provide the Vickers height at failure. The properties of the glass substrates, as well as the height at failure test results are shown in Table 3 below.

a height at failure of greater than or equal to 400 mm and less than or equal to 1000 mm.

The glass substrates that include the compositions and mechanical strengthening described herein outperform the comparative examples. Specifically, Example A has at least twice the failure height of Comparative Example 1, an annealed soda lime glass of the same thickness. Furthermore, Examples B, C, D, and E each have median height of failures greater than all of the comparative examples.

Figure 5:
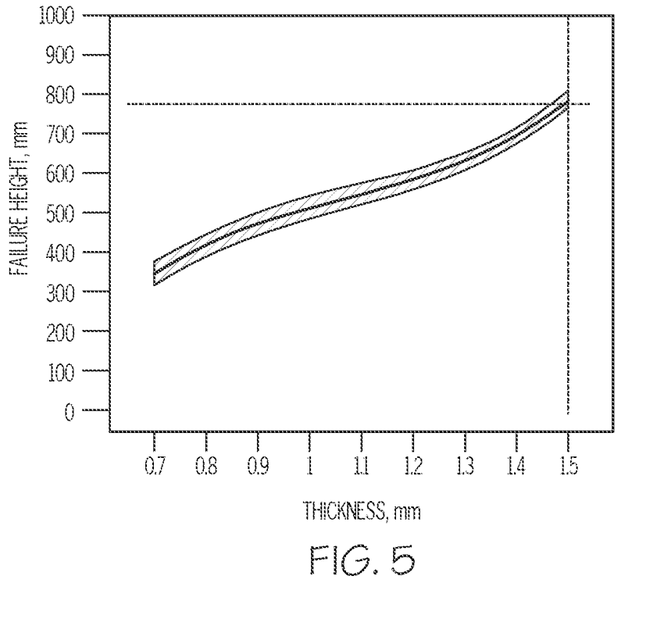
FIG. 5 is a statistical data analysis plot of the effect of total substrate thickness on failure height in which the failure height is plotted on the y-axis and the total substrate thickness is plotted on the x-axis.

In embodiments, the total thickness of the glass substrate may be adjusted to provide for an increased Vickers test failure height, as shown in FIG. 5. FIG. 5 shows that as the total thickness of the glass substrate increases, the failure height also increases. That is, the failure height is directly related to the total thickness of the glass substrate. Referring to FIG. 5, a total thickness of about 1.5 achieves the highest failure height at about 777.2551 mm.

Figure 6:
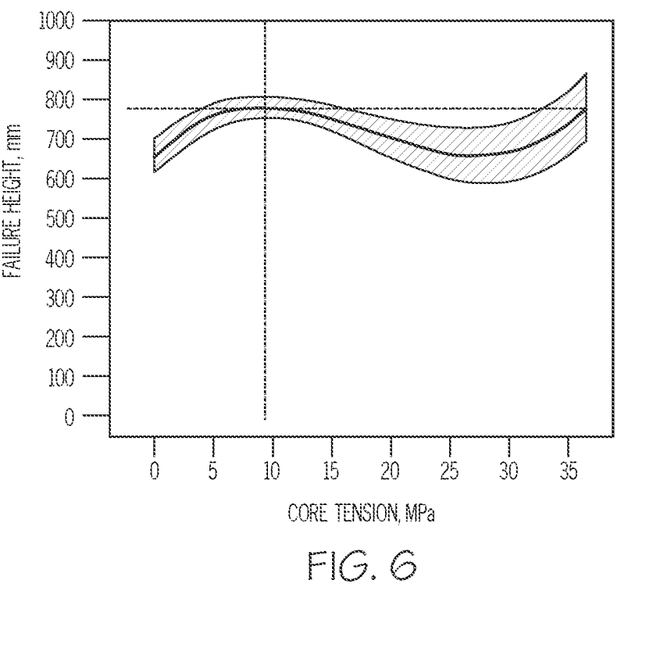
FIG. 6 is a statistical data analysis plot of the effect of core tension on failure height in which the failure height is plotted on the y-axis and core tension is plotted on the x-axis.

In embodiments, the tensile stress in the glass core layer, also known as core tension, may be adjusted to provide for an increased Vickers test failure height, as shown in FIG. 6. Referring to FIG. 6, as the core tension of the glass substrate increases up to about 9.19 MPa, the failure height also increases. However, the failure height decreases as the core tension of the glass substrate increases from about 9.19 MPa to about 26 MPa. As the core tension increases after about 26 MPa, the failure height again increases with increasing core tension. That is, the failure height is directly related to the core tension of the glass substrate from 0 MPa to about 9.19 MPa, the failure height is indirectly related to the core tension of the glass substrate from 9.19 MPa to about 26 MPa, and the failure height is directly related to the core tension of the glass substrate when the core tension is greater than about 26 MPa. Referring to FIG. 6, a core tension of about 9.19 MPa achieves peak failure height of about 777.2551 mm before the failure height begins to decrease as core tension increases. Although a core tension of about 37

TABLE 3

| Sample | Thickness (mm) | Glass Composition | Ratio (Clad Layer to Total Thickness) | Depth of Compression (%) | Height at Failure (mm) |
|---|---|---|---|---|---|
| Comparative Example 1 | 1.05 | Annealed Soda Lime Glass | — | — | 100 |
| Comparative Example 2 | 1.1 | Dragontrail ™ 805/41 | — | — | >50 ≤ 150 |
| Comparative Example 3 | 0.7 | Corning ® Eagle XG ® | — | — | >200 ≤ 400 |
| Comparative Example 4 | 1.3 | Corning ® Eagle XG ® | — | — | >300 ≤ 550 |
| Comparative Example 5 | 1.0 | 2318 | — | — | 100 |
| Example A | 0.7 | C1 and CL1 | 4.2 | 9.6 | >250 ≤ 400 |
| Example B | 1.0 | C1 and CL1 | 4.0 | 10 | >400 ≤ 600 |
| Example C | 1.3 | C1 and CL1 | 4.0 | 10 | >400 ≤ 1000 |
| Example D | 1.5 | C1 and CL1 | 4.0 | 10 | >550 ≤ 850 |
| Example E | 1.5 | C1 and CL1 | 3 | 12.5 | >700 ≤ 1000 |
| Example F | 1.0 | C2 and CL2 | 7 | 6.25 | >100 ≤ 111 |

As shown by the data shown in FIGS. 3 and 4 and in Table 3, the compositions and mechanical strengthening of the glass substrate as described herein can result in improved indentation fracture resistance performance. Accordingly, as demonstrated by the examples, glass substrates that include the compositions and mechanical strengthening described herein can exhibit a height at failure of greater than 550 mm. For example, a glass substrate as described herein may have MPa also achieves a failure height of about 777.2551 mm, this core tension of about 37 MPa may be greater than a frangibility limit of the glass core layer.

In various embodiments described herein, glass substrates in the form of a glass laminate having damage-resistant glass clad layers fused to a glass core layer may exhibit improved Vickers dart drop test failure heights as a result of the balance of a core tension below about 20 MPa with a compressive stress in the glass clad layers and a DOC of at least 10% of the thickness of the glass substrate. It is believed that by keeping the core tension below about 20 MPa, delayed cracks or breakage of the glass substrate as flaws reach the glass core layer can be reduced or eliminated.

The glass substrates described herein can be used for a variety of applications including, for example, for cover glass or glass backplane applications in consumer or commercial electronic devices including, for example, LCD and LED displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; or for commercial or household appliance applications. In various embodiments, a consumer electronic device (e.g., smartphones, tablet computers, personal computers, ultrabooks, televisions, and cameras), an architectural glass, and/or an automotive glass comprises a glass substrate as described herein. In particular, the glass substrates described herein may be particularly suitable for automotive and other exterior applications in which the glass substrate is exposed to an aggressive environment, and can be subjected to mechanical impacts by various physical objects as well as temperature fluctuations. Specifically, because such substrates are strengthened by mechanical means and maintain their strength after being subjected to thermal cycling, the glass substrates described herein can withstand environmental conditions without losing their strength.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass substrate comprising:
   a glass clad layer fused to a glass core layer, wherein:
   the glass core layer comprises a core glass composition having an average core coefficient of thermal expansion ($CTE_{core}$);
   the glass clad layer comprises a clad glass composition having an average clad coefficient of thermal expansion ($CTE_{clad}$) that is less than the $CTE_{core}$;
   a maximum tensile stress in the glass core layer is less than 15 MPa; and
   a compressive stress in the glass substrate extends from a surface of the glass clad layer to a depth of compression of greater than or equal to 10% of a total thickness of the glass substrate; and
   the clad glass composition comprises boron and greater than or equal to 55 wt. % $SiO_2$ and less than or equal to 80 wt. % $SiO_2$.

2. The glass substrate of claim 1, wherein the clad glass composition comprises greater than or equal to 10 wt. % $B_2O_3$ and less than or equal to 50 wt. % $B_2O_3$.

3. The glass substrate of claim 1, wherein the clad glass composition comprises greater than or equal to 10 wt. % $B_2O_3$ and less than or equal to 25 wt. % $B_2O_3$.

4. The glass substrate of claim 1, wherein the core glass composition comprises less than or equal to 5 wt. % $B_2O_3$.

5. The glass substrate of claim 1, wherein the maximum tensile stress in the glass core layer is less than 12 MPa.

6. The glass substrate of claim 1, wherein the maximum tensile stress in the glass core layer is less than 10 MPa.

7. The glass substrate of claim 1, wherein the glass clad layer has a maximum compressive stress that is less than 180 MPa.

8. The glass substrate of claim 1, wherein the glass clad layer has a maximum compressive stress that is less than 150 MPa.

9. The glass substrate of claim 1, wherein the compressive stress in the glass substrate extends from the surface of the glass clad layer to the depth of compression of greater than or equal to 10% of a total thickness of the glass substrate and less than or equal to 40% of the total thickness of the glass substrate.

10. A glass substrate comprising:
    a glass clad layer fused to a glass core layer, wherein:
    the glass core layer comprises a core glass composition having an average core coefficient of thermal expansion ($CTE_{core}$);
    the glass clad layer comprises a clad glass composition having an average clad coefficient of thermal expansion ($CTE_{clad}$) that is less than the $CTE_{core}$;
    a maximum tensile stress in the glass core layer is less than 12 MPa; and
    the clad glass composition comprises:
        greater than or equal to 10 wt. % $B_2O_3$ and less than or equal to 50 wt. % $B_2O_3$, and
        greater than or equal to 55 wt. % $B_2O_3$ and less than or equal to 80 wt. % $B_2O_3$.

11. The glass substrate of claim 10, wherein a compressive stress in the glass substrate extends from a surface of the glass clad layer to a depth of compression of greater than or equal to 10% of a total thickness of the glass substrate.

12. The glass substrate of claim 10, wherein the glass clad layer has a maximum compressive stress that is less than 150 MPa.

13. The glass substrate of claim 10, wherein the glass clad layer has a maximum compressive stress that is less than 100 MPa.

14. The glass substrate of claim 10, wherein the clad glass composition comprises greater than or equal to 10 wt. % $B_2O_3$ and less than or equal to 25 wt. % $B_2O_3$.

15. The glass substrate of claim 10, wherein the core glass composition comprises less than or equal to 5 wt. % $B_2O_3$.

16. The glass substrate of claim 10, wherein the maximum tensile stress in the glass core layer is less than 10 MPa.

17. The glass substrate of claim 1, wherein the clad glass composition comprises greater than or equal to 3 wt. % $Al_2O_3$ and less than or equal to 17 wt. % $Al_2O_3$.

18. The glass substrate of claim 10, wherein the clad glass composition comprises greater than or equal to 3 wt.% $Al_2O_3$ and less than or equal to 17 wt. % $Al_2O_3$.

19. The glass substrate of claim 1, wherein a total thickness of the glass substrate is greater than or equal to about 0.8 mm.

20. A glass substrate comprising:
    a glass clad layer fused to a glass core layer, wherein:
    the glass core layer comprises a core glass composition having an average core coefficient of thermal expansion ($CTE_{core}$);
    the glass clad layer comprises a clad glass composition having an average clad coefficient of thermal expansion ($CTE_{clad}$) that is less than the $CTE_{core}$;
    a maximum tensile stress in the glass core layer is less than 15 MPa;

a compressive stress in the glass substrate extends from a surface of the glass clad layer to a depth of compression of greater than or equal to 10% of a total thickness of the glass substrate;

the clad glass composition comprises greater than or equal to 55 wt. % $SiO_2$ and less than or equal to 80 wt. % $SiO_2$; and the core glass composition comprises less than or equal to 5 wt. % $B_2O_3$.

* * * * *

UNITED STATES PATENT AND TRADEMARK OFFICE
CERTIFICATE OF CORRECTION

PATENT NO. : 11,912,010 B2
APPLICATION NO. : 17/437191
DATED : February 27, 2024
INVENTOR(S) : Petr Gorelchenko et al.

Page 1 of 1

It is certified that error appears in the above-identified patent and that said Letters Patent is hereby corrected as shown below:

In the Claims

In Column 19, Line 52, in Claim 1, delete "MPa; and" and insert -- MPa; --.
In Column 20, Line 30, in Claim 10, delete "$B_2O_3$" and insert -- $SiO_2$ --.
In Column 20, Line 31, in Claim 10, delete "$B_2O_3$." and insert -- $SiO_2$. --.
In Column 20, Line 54, in Claim 18, delete "$Al_2O_3$ ." and insert -- $Al_2O_3$ --.

Signed and Sealed this
Twenty-ninth Day of October, 2024

Katherine Kelly Vidal
*Director of the United States Patent and Trademark Office*